United States Patent
Lebeault et al.

(12)

(10) Patent No.: US 12,215,607 B1
(45) Date of Patent: Feb. 4, 2025

(54) UNDUCTED TURBINE ENGINE COMPRISING STATOR BLADES HAVING DIFFERENT CHORDS

(71) Applicant: SAFRAN AIRCRAFT ENGINES, Paris (FR)

(72) Inventors: Eva Julie Lebeault, Moissy-Cramayel (FR); Laurent Soulat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/718,654

(22) PCT Filed: Dec. 12, 2022

(86) PCT No.: PCT/EP2022/085288
§ 371 (c)(1),
(2) Date: Jun. 11, 2024

(87) PCT Pub. No.: WO2023/110701
PCT Pub. Date: Jun. 22, 2023

(30) Foreign Application Priority Data

Dec. 13, 2021 (FR) ...................................... 2113370

(51) Int. Cl.
*F02C 6/20* (2006.01)
*B64C 11/20* (2006.01)
(Continued)

(52) U.S. Cl.
CPC .............. *F01D 9/041* (2013.01); *B64C 11/20* (2013.01); *F02C 6/206* (2013.01); *B64C 11/08* (2013.01); *F02C 7/20* (2013.01); *F05D 2220/325* (2013.01)

(58) Field of Classification Search
CPC ...... F02C 6/206; F02C 7/20; F05D 2220/325; F05D 2260/961; B64C 11/00; B64C 11/08; B64D 2027/005
See application file for complete search history.

(56) References Cited

U.S. PATENT DOCUMENTS

2016/0010487 A1* 1/2016 Breeze-Stringfellow ................... F01D 17/16 415/208.1
2017/0313430 A1* 11/2017 Pautis ..................... B64C 11/30
(Continued)

FOREIGN PATENT DOCUMENTS

| FR | 2681644 B1 | 2/1995 |
|---|---|---|
| FR | 3083207 B1 | 12/2020 |
| FR | 3092868 B1 | 1/2021 |

OTHER PUBLICATIONS

French Search Report for FR2113370, filed Jul. 8, 2022, 2 pages.
International Search Report for PCT/EP2022/085288, Filed Mar. 16, 2023, 2 pages.

*Primary Examiner* — Eldon T Brockman
(74) *Attorney, Agent, or Firm* — RANKIN, HILL & CLARK LLP

(57) ABSTRACT

An aircraft including at least one unducted turbine engine for the propulsion of the aircraft. The turbine engine comprising: a rotor and a stator comprising a plurality of stator blades extending radially with respect to the longitudinal axis, each stator blade being defined, in a plane transverse to the longitudinal axis, by an angular position; and at least one aerodynamic obstruction positioned close to the turbine engine. The stator of the turbine engine comprises stator blades having a first chord, referred to as conventional blades, and at least one stator blade having a second chord larger than the first chord, referred to as the elongate blade, said at least one elongate blade being positioned in an (Continued)

interference angular range defined opposite the aerodynamic obstacle, so as to increase the straightening of the airflow from the rotor in the interference angular range.

10 Claims, 3 Drawing Sheets

(51) Int. Cl.
    *F01D 9/04*     (2006.01)
    *B64C 11/08*     (2006.01)
    *F02C 7/20*     (2006.01)

(56) References Cited

U.S. PATENT DOCUMENTS

| | | | |
|---|---|---|---|
| 2018/0065727 A1* | 3/2018 | Gruber | B64D 29/04 |
| 2021/0108523 A1* | 4/2021 | Miller | F02K 3/06 |
| 2021/0108572 A1* | 4/2021 | Khalid | F01D 7/00 |

* cited by examiner

UNDUCTED TURBINE ENGINE COMPRISING STATOR BLADES HAVING DIFFERENT CHORDS

TECHNICAL FIELD

This invention relates to the field of the turbine engines used for the propulsion of an aircraft, and more specifically to a stator of an unducted turbine engine.

In a known way, an aircraft comprises a turbine engine extending longitudinally along an axis and allowing the aircraft to be moved by an air flow circulating from upstream to downstream. Hereafter, the terms "upstream" and "downstream" are defined in relation to the longitudinal axis running from upstream to downstream. Similarly, the terms "inside" and "outside" are defined in the radial direction with respect to the axis.

The turbine engine comprises a primary vein bounded by a casing, referred to as the "inter-vein casing", and supplied by an upstream fan. The fan allows to produce a primary air flow inside the inter-vein casing and a secondary air flow around the inter-vein casing. The fan, also referred to as the "rotor", is mounted so that it can rotate around the longitudinal axis and accelerates the air flow from upstream to downstream.

The turbine engine comprises an unducted fan with no outer casing, known to the person skilled in the art as an "open rotor". The advantage of this type of turbine engine is that it has a reduced mass because there is no outer casing. In other words, the secondary air flow circulating outside the inter-vein casing circulates in a secondary vein open to the outside.

In a known way, the turbine engine comprises a stator downstream of the fan allowing to straighten the air flow accelerated by the fan. The stator comprises a plurality of stator vanes, also referred to as "flow straightener", extending radially between a root connected to the inter-vein casing and a free head.

One of the main functions of a stator is to divert the direction of the air flow in order to modify the kinetic energy so that it can be exploited for the thrust of the turbine engine. The stator therefore helps to reduce the aerodynamic losses, ensure a good turbine engine efficiency and guarantee a robustness when the air flow strikes the stator to ensure stable turbine engine operation. As is well known, the stator vanes have a precise, predefined geometry that allows them to perform the aforementioned functions as well as possible. The stator vanes are dimensioned to have a predefined cross-section and an orientation to optimise the deflection of the air flow. In practice, all the stator vanes have the same length, the same chord and the same pitch at all times.

An unducted turbine engine has the disadvantage of being sensitive to the incidence of the outer air flow, compared with a ducted turbine engine such as a turbojet engine. The presence of an aerodynamic obstacle, such as a wing or a connecting pylon connecting the turbine engine to the fuselage of the aircraft, can result in a heterogeneous air flow that can affect the performance of the turbine engine.

The invention thus aims to eliminate at least some of these disadvantages by offering an unducted turbine engine with an optimum thrust, even in the presence of an obstacle in the vicinity of the turbine engine.

The document FR3092868 describes a turbojet engine (ducted turbine engine) comprising a stator wheel in a secondary vein, comprising vanes with different chords. The different chords allow each vane to be used for a specific function. In particular, each vane of the stator wheel described in the document FR3092868 is intended, for example, to improve the taken up and the transmission of the forces in the turbine engine or to improve the heat exchange between a flow of hot primary air circulating in the primary vein and a flow of cold secondary air circulating in the secondary vein. Also known from the document FR3083207 is a propulsion assembly in which one of the stator vanes is physically connected to the pylon.

SUMMARY

The invention relates to an aircraft comprising:
at least one unducted turbine engine for the propulsion of the aircraft, the turbine engine extending along a longitudinal axis and being configured to accelerate an air flow circulating from upstream to downstream, the turbine engine comprising a rotor and a stator, mounted downstream of the rotor, the stator comprising a plurality of stator vanes for straightening the air flow coming from the rotor, extending radially with respect to the longitudinal axis and distributed angularly about the longitudinal axis, each stator vane comprising a leading edge and a trailing edge defining between them a chord in a plane of revolution defined with respect to the longitudinal axis, each stator vane being defined, in a plane transverse to the longitudinal axis, by an angular position,
at least one aerodynamic obstacle, positioned close to the turbine engine, the aerodynamic obstacle causing a change in the circulation of the air flow.

The aircraft is remarkable in that the stator of the turbine engine comprises stator vanes having a first chord, referred to as conventional vanes, and at least one stator vane having a second chord, larger than the first chord, referred to as elongated vane, said at least one elongated vane being positioned in a interference angular range defined in relation with the aerodynamic obstacle, so as to increase the straightening of the air flow from the rotor in the interference angular range.

The expression "in relation with" means that the elongated vane and the aerodynamic obstacle are aligned in relation to the longitudinal axis.

An aircraft of this type allows to adapt the geometry of each stator vane as a function of its angular position on the stator, so as to adapt the load distribution of each stator vane as a function of its proximity to an aerodynamic obstacle. An elongated vane facing the aerodynamic obstacle allows it to support a larger load due to the aerodynamic obstacle, which disturbs the air flow passing through the turbine engine. A turbine engine of this type therefore limits the risk of local stator overload and therefore the risk of aerodynamic separation.

Preferably, the at least one elongated vane is positioned only within the interference angular range defined in relation with the aerodynamic obstacle. In this embodiment, the assembly of the vanes positioned in an angular range outside the interference angular range is a vane with a chord less than or equal to the chord of the conventional vanes.

Preferably, the aircraft comprises a connecting pylon for connecting the turbine engine to the aircraft, said pylon forming the aerodynamic obstacle. In this way, the stator of the turbine engine has an elongated vane in relation with the connecting pylon, improving the stator performance in the vicinity. This makes the turbine engine more efficient, providing a larger thrust while limiting fuel consumption.

Preferably, the stator comprises at least two elongated vanes positioned in the interference angular range, in relation with the aerodynamic obstacle, allowing the chord of several stator vanes to be adapted in order to optimise the complete geometry of the stator and adapt the chord of several stator vanes to the loading to which they are subjected.

Preferably, no elongated vane is positioned outside the interference angular range, which limits any risk of underloading a vane whose chord is too large in relation to the air flow it receives. A vane with a chord that is locally too large could penalise the propulsion assembly by making it unnecessarily heavy.

Preferably, the angular positions being defined in a clockwise direction of rotation over an angular range of 0° to 360°, with the angular position 0° being defined as the top position relative to a vertical axis, the aerodynamic obstacle extending substantially around an angular position β, at least a majority of the stator vanes positioned at an angular position of between −45° and +45° around the angular position β are elongated vanes. In this way, several vanes positioned at least partially in relation with the aerodynamic obstacle have an elongated chord, allowing the chord of several stator vanes to be adapted in order to optimise the overall geometry of the stator and adapt the chord of several vanes to the load they are subjected to. This amplitude of −45° to +45° also means that substantially the assembly of the vanes positioned at least partly in relation with the aerodynamic obstacle can be covered.

In one embodiment, the angular positions being defined in a clockwise direction of rotation over an angular range of 0° to 360°, with the angular position 0° being defined as the high position relative to a vertical axis, the aerodynamic obstacle extending substantially around an angular position β, the assembly the stator vanes positioned at an angular position of between −45° and +45° around the angular position β are elongated vanes. In this way, all the vanes positioned at least partially in relation with the aerodynamic obstacle have an elongated chord, allowing to optimise the overall geometry of the stator and to adapt the chord of the vanes to the load to which they are subjected.

In one embodiment, with the aerodynamic obstacle extending substantially around the angular position 0°, at least a majority of the vanes positioned at an angular position between 315° and 45° around the angular position 0° are elongated vanes. This configuration allows the chord of the assembly of the vanes to be adapted when they are positioned at least partly in relation with a connecting pylon, for example in the case of a turbine engine attached under a wing of an aircraft.

In one embodiment, with the aerodynamic obstacle extending substantially around the angular position 0°, the assembly of the vanes positioned at an angular position of between 315° and 45° around the angular position 0° are elongated vanes. This configuration allows the chord of the assembly of the vanes to be adapted when they are positioned at least partly in relation with a connecting pylon, for example in the case of a turbine engine attached under a wing of an aircraft.

Alternatively, as the aerodynamic obstacle extends substantially around the angular position 90°, at least a majority of the vanes positioned at an angular position between 45° and 135° are elongated vanes.

In one embodiment, with the aerodynamic obstacle extending substantially around the angular position 90°, the assembly of the vanes positioned at an angular position between 45° and 135° are elongated vanes. Such a configuration allows to adapt the chord of the assembly of the vanes positioned at least partly in relation with a connecting pylon, for example in the case of a turbine engine attached laterally to the fuselage of an aircraft (to the left of the aircraft in a front view located upstream of the aircraft). This configuration also allows the chord of the vanes to be adapted to the presence of the fuselage itself close to the turbine engine.

Alternatively, as the aerodynamic obstacle extends substantially around the angular position 270°, at least a majority of the vanes positioned at an angular position between 225° and 315° are elongated vanes.

In one embodiment, with the aerodynamic obstacle extending substantially around the angular position 270°, the assembly of the vanes positioned at an angular position between 225° and 315° are elongated vanes. Such a configuration allows to adapt the chord of the assembly of the vanes positioned at least partly in relation with a connecting pylon, for example in the case of a turbine engine attached laterally to the fuselage of an aircraft (to the right of the aircraft in a front view located upstream of the aircraft). This configuration also allows the chord of the vanes to be adapted to the presence of the fuselage itself close to the turbine engine.

Preferably, the stator of the turbine engine comprises at least one stator vane having a third chord, referred to as a shortened vane, the third chord being smaller than the first chord, so as to limit the risk of underloading a vane, said at least one shortened vane is positioned in an angular range diametrically opposed to the interference angular range. Each vane thus has a reduced third chord, allowing to limit the risk of underloading a vane whose chord is too large for the air flow it receives.

In one embodiment, each shortened vane is diametrically opposed to an elongated vane, allowing an optimal geometry of the assembly of the stator for optimum performance of the turbine engine.

Preferably, the diametrically opposed term is determined in relation to the axis of the turbine engine.

Preferably, the interference angular range is free of shortened vanes, with each stator vane positioned within the interference angular range having a chord at least equal to the chord of a conventional vane. In other words, each shortened vane is positioned outside the interference angular range so as to avoid the presence of a shortened vane that would be particularly overloaded in relation to the aerodynamic obstacle.

Preferably, each vane positioned outside the interference angular range has a chord less than or equal to the chord of a conventional vane. This allows to limit any risk of underloading a vane that is not facing the aerodynamic obstacle and is subject to a flow that is not particularly strong.

In a preferred embodiment, the number of elongated vanes is less than 50% of the total number of stator vanes, in the same transverse plane. Preferably, the number of elongated vanes represents less than 40%, preferably less than 30%, even more preferably less than 20%, of the total number of stator vanes in a single transverse plane. In this way, the elongated vanes are used sparingly to straighten an air flow that is particularly disturbed by the presence of an aerodynamic obstacle, so as not to penalise the aerodynamic performance.

Preferably, the first chord having a length, the third chord has a length of between 70% and 95% of the length of the first chord. Such a third chord allows to optimise the chord of the vane during loading, while limiting the chord difference and therefore the risk of local disturbances.

Preferably, first chord having a length, the second chord has a length of between 105% and 130% of the length of the first chord. This second chord allows to optimise the chord of the vane during loading, while limiting the chord difference and therefore the risk of local disturbances.

Preferably, the chord difference between two adjacent stator vanes is less than or equal to 25%. A limited chord difference for two adjacent vanes allows to limit the risk of local flow disturbances that could affect the stator operation.

Preferably, each stator vane having a maximum thickness in the plane of revolution, the relative thickness of a stator vane corresponding to the ratio of the maximum thickness to the chord, the difference in relative thickness between two adjacent stator vanes having different chords is less than or equal to 25%. This difference in relative thickness allows to limit the local flow disturbances between two adjacent vanes of different chords.

DESCRIPTION OF DRAWINGS

The invention will be better understood on reading the following description, given by way of example, with reference to the following figures, given by way of non-limiting examples, in which identical references are given to similar objects.

It should be noted that the figures set out the invention in detail in order to implement the invention, said figures of course being able to be used to better define the invention if necessary.

DETAILED DESCRIPTION

The invention is described in this document with reference to a turbine engine mounted in an aircraft, but it goes without saying that it can be applied to any type of aircraft.

Figure 1:
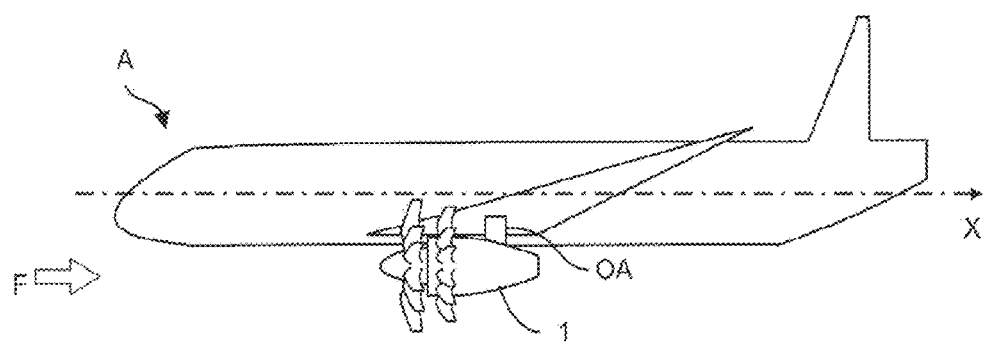
FIG. 1 is a schematic representation of an aircraft comprising an unducted turbine engine according to one embodiment of the invention and an aerodynamic obstacle.
Figure 2:
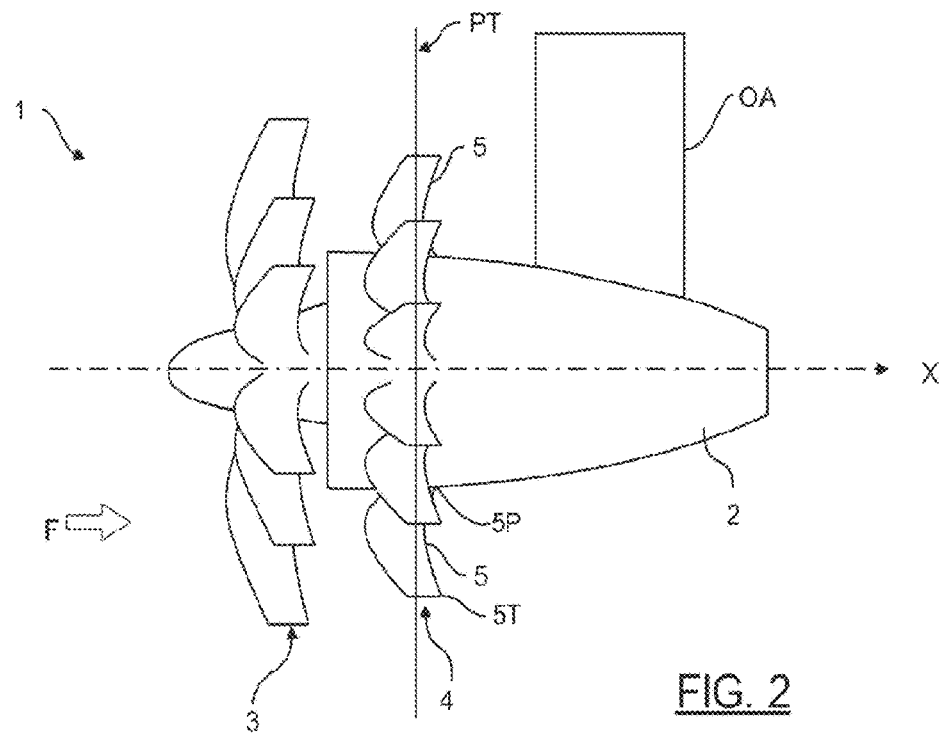
FIG. 2 is a schematic representation of the unducted turbine engine of FIG. 1 comprising a rotor and a stator.

The aircraft A according to the invention is shown in FIGS. 1 and 2. To this end, with reference to FIG. 1, the aircraft A (in this example an aeroplane) comprises a turbine engine 1 extending longitudinally along an axis X and allowing the aeroplane to be moved by an air flow F entering the turbine engine 1 and circulating from upstream to downstream. Hereafter, the terms "upstream" and "downstream" are defined in relation to the longitudinal axis X running from upstream to downstream.

Still referring to the example in FIG. 1, the aircraft A also comprises an aerodynamic obstacle OA close to the turbine engine 1, mounted downstream of the latter. The aerodynamic obstacle OA is positioned at least partly in relation with the turbine engine 1. The expression "in relation with" means that the aerodynamic obstacle OA and the turbine engine 1 are aligned with respect to the axis X. The term "aerodynamic obstacle" describes any device or system mounted in the vicinity of the turbine engine 1 and likely to disturb the air flow F coming from the turbine engine 1 and circulating from upstream to downstream. By way of a non-limiting example, such an aerodynamic obstacle OA may be a portion of the fuselage, a wing of the aircraft A or any structural device mounted on the aircraft A. In this document, as shown in FIGS. 1 and 2, the aerodynamic obstacle OA is, for example, a connecting pylon connecting the turbine engine 1 to the aircraft A. This document presents the example of an aerodynamic obstacle OA mounted downstream of the turbine engine 1, however it goes without saying that the aerodynamic obstacle OA could be mounted upstream of the turbine engine 1.

In a known way, with reference to FIG. 2, the turbine engine 1 comprises a primary vein delimited by a casing, designated "inter-vein casing" 2, and supplied by an upstream fan, designated rotor 3, mounted so as to rotate about the axis X. The rotor 3 allows to accelerate the air flow F from upstream to downstream. In practice, the acceleration of the air flow F allows to generate a thrust force that allows the aircraft A to move.

According to the invention, the turbine engine 1 is unducted, i.e. it has no outer casing. Such a configuration of the turbine engine 1 is known to those person skilled in the art under the generic name of "open rotor" and will not be described in larger detail in this document.

Still referring to FIG. 2, the turbine engine 1 comprises a stator 4, mounted downstream of the rotor 3 and allowing the air flow F accelerated by the rotor 3 to be straightened. The stator 4 comprises a plurality of stator vanes 5, also referred to as "flow straightener", extending radially with respect to the longitudinal axis X between a root 5P connected to the inter-vein casing 2 and a free head 5T. In the example shown, the flow air inlet in the primary vein is located between the rotor 3 and the stator 4.

In this embodiment, the turbine engine 1 comprises only a rotor 3 and a stator 4, to give it a simple, lightweight structure. In addition, the rotor 3/stator 4 pair is mounted upstream of the turbine engine 1 to form a "puller" type turbine engine. It goes without saying that the rotor 3/stator 4 pair could be mounted downstream of the turbine engine 1 so as to form a "pusher" type turbine engine.

Figure 3:
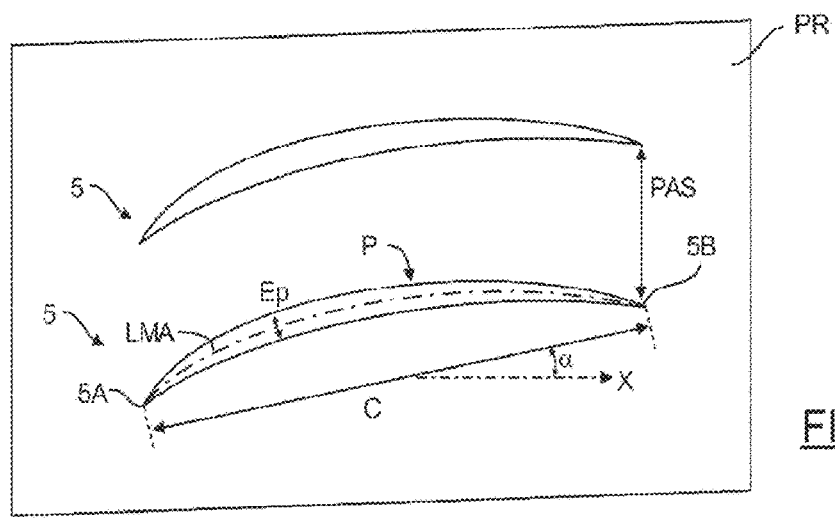
FIG. 3 is a schematic representation of the stator vanes of FIG. 2, in cross-section in a plane of revolution about a longitudinal axis X.

In a known manner, with reference to FIG. 3, each stator vane 5 comprises a leading edge 5A, corresponding to the end located upstream and first coming into contact with the air flow F, and a trailing edge 5B, located downstream. Each stator vane 5 has a profile that is determined, in cross-section, in a plane of revolution PR about the longitudinal axis X of the turbine engine 1. The plane of revolution PR is determined for a predetermined radial distance. In practice, each stator vane 5 comprises a plurality of characteristic profiles, determined in a plurality of planes of revolution about the longitudinal axis X of the turbine engine, along the length of the turbine engine 1.

In the plane of revolution PR, with reference to FIG. 3, each stator vane 5 has an elongated profile P from the leading edge 5A to the trailing edge 5B. In a known way, the profile P is defined according to a plurality of geometric characteristics such as a length and a thickness. In this example, the profile P of a stator vane 5 is characterised by the distance between the leading edge 5A and the trailing edge 5B, designated chord C, and the maximum thickness $E_p$. In this example, the maximum thickness $E_p$ is defined orthogonally to the mean line direction of the vane LMA. As illustrated in FIG. 3, this mean line LMA (also known to the person skilled in the art as the skeleton line or camber line) connects the leading edge 5A to the trailing edge 5B and is equidistant from the pressure side and from the suction side. Similarly, still with reference to FIG. 3, a stator vane 5 is characterised by the inclination of its chord C with respect to the longitudinal axis X of the turbine engine 1. Subsequently, for a profile P, a pitch angle α is defined between the longitudinal axis X and the chord C. Finally, a stator 4 is characterised by its pitch PAS corresponding to the distance between the trailing edges 5B of two adjacent stator vanes 5 as illustrated in FIG. 3.

Figure 4:
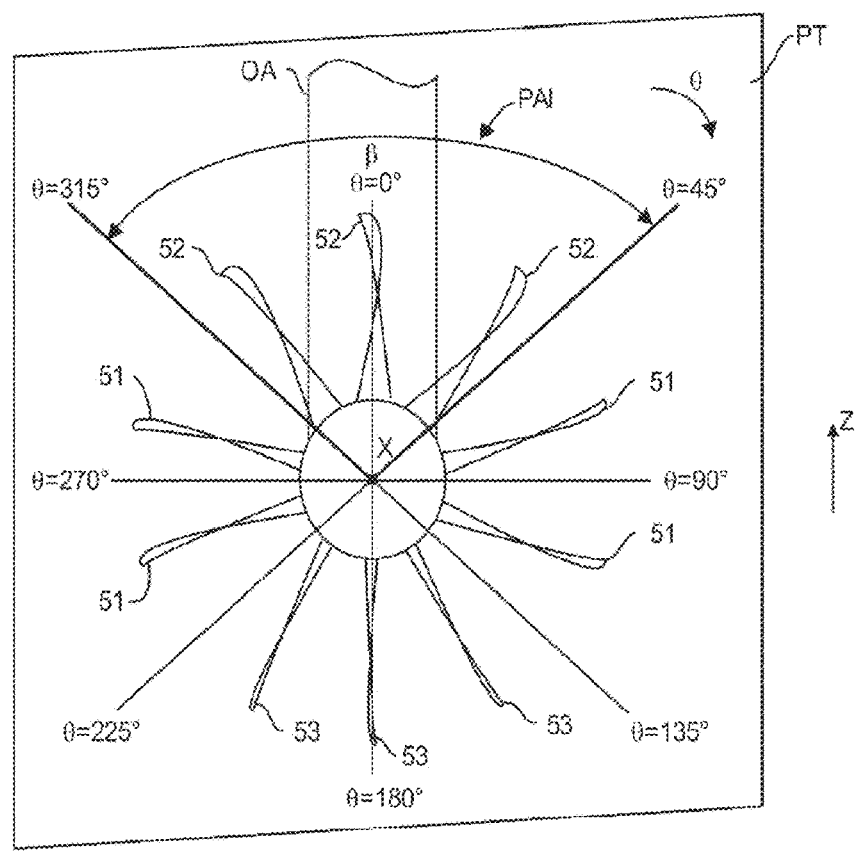
FIG. 4 is a schematic representation in a plane transverse to the longitudinal axis X, of the vanes of the stator of FIG. 3 in the example of an aerodynamic obstacle positioned at an angular position of 0°.

With reference to FIG. 4, the stator vanes 5 are angularly distributed around the longitudinal axis X in a plane PT transverse to the longitudinal axis X, shown in FIG. 2. Each stator vane 5 is defined, in the transverse plane PT, by an angular position θ, within an angular range extending between 0° and 360°. In this example, the angular position 0° is defined as the top position relative to a vertical axis Z extending from bottom to top, as shown in FIG. 4. Similarly, the angular positions θ are defined as increasing between 0° and 360° in a clockwise direction of rotation about the longitudinal axis X from the position 0°.

Figure 5:
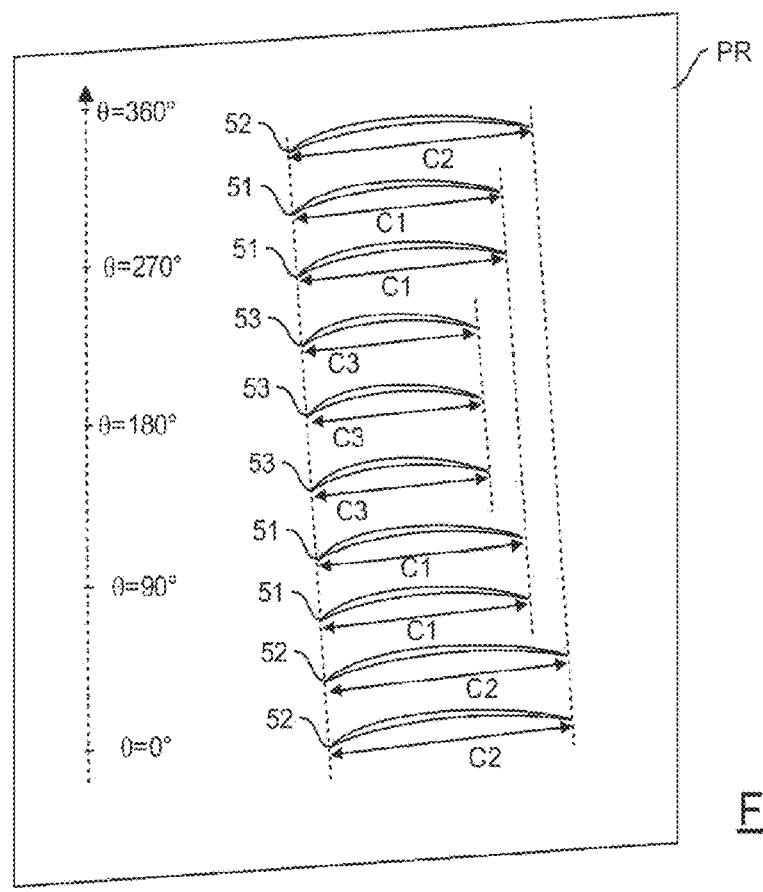
FIG. 5 is a schematic representation of the chord of each vane of the stator in FIG. 3 in the plane of revolution.

With reference to FIGS. 4 and 5, the stator 4 comprises, in the transverse plane PT, a plurality of stator vanes 5 having a first chord C1. Such stator vanes 5 are referred to as "conventional vanes" 51. The first chord C1 is preferably between 200 and 600 mm.

The stator 4 of the turbine engine 1 according to the invention further comprises a plurality of stator vanes 5 having a second chord C2, the second chord C2 being larger than the first chord C1 in the transverse plane PT, as shown in FIG. 5. Such stator vanes 5 are referred to as "elongated vanes" 52. Preferably, the second elongated chord C2 has a length of between 105% and 130% of the length of the first chord C1. Even more preferably, the length of the elongated second chord C2 is between 105% and 115% of the length of the first chord C1. In this example, the stator 4 comprises a plurality of elongated vanes 52, although it goes without saying that the stator 4 could just as easily comprise a single elongated vane 52.

According to the invention, as shown in FIG. 4, each elongated vane 52 is angularly positioned at least partly within an interference angular range PAI, defined in relation with the aerodynamic obstacle OA. In other words, the aerodynamic obstacle OA and the elongated vanes 52 are aligned, at least partially, with respect to the longitudinal axis X. The elongated vanes 52 increase the straightening of the air flow from the rotor 3 in the interference angular range PAI in relation with the aerodynamic obstacle OA, so as to limit disturbances to the air flow F downstream of the turbine engine 1 in the axis of the aerodynamic obstacle OA. The geometry of each stator vane 5 is thus adapted according to its load. A longer chord C allows to avoid the overloading of a stator vane 5 which would be particularly stressed.

In other words, preferably no elongated vane 52 is positioned entirely within an angular range outside the interference angular range PAI. When a vane is not facing the aerodynamic obstacle OA, it is not subjected to larger disturbances and the air flow does not have to be straightened to a larger extent.

In the example shown in FIG. 4, the aerodynamic obstacle OA, i.e. the connecting pylon, extends vertically and is attached to an upper portion of the turbine engine 1 along a vertical axis Z, i.e. at an angular position of 0°.

In this example, as shown in FIG. 4, the stator 4 comprises three elongated vanes 52 in the interference angular range PAI, which are either entirely or partially in relation with the aerodynamic obstacle OA.

This document presents the example of a stator 4 comprising three elongated vanes 52, however it goes without saying that the stator 4 could just as easily comprise a different number of elongated vanes 52. In other words, it goes without saying that the interference range PAI could just as easily comprise a single elongated vane 52, two elongated vanes 52 or a number larger than three elongated vanes 52. It also goes without saying that the interference range PAI could comprise both conventional vanes 51 and elongated vanes 52.

By way of example, the stator 4 comprising ten stator vanes 5, angularly distributed around the longitudinal axis X, the elongated vanes 52 corresponding to the stator vanes 5 in relation with the aerodynamic obstacle OA, cover an angular range of between 315° and 45° in the clockwise direction of rotation as illustrated in FIG. 4.

Preferably, the stator 4 of the turbine engine 1 also comprises a plurality of stator vanes 5 having a third chord C3, the third chord C3 being smaller than the first chord C1 in the transverse plane PT, as shown in FIG. 5. Such stator vanes 5 are referred to as "shortened vanes" 53. Preferably, the shortened third chord C3 has a length of between 70% and 95% of the length of the first chord C1. Even more preferably, the length of the shortened third chord C3 is between 85% and 95% of the length of the first chord C1.

In this example, with reference to FIG. 4, each shortened vane 53 is angularly positioned, in the transverse plane PT, so as to belong to an angular range diametrically opposed to the interference angular range PAI. In particular, in this example, each shortened vane 53 is diametrically opposed to an elongated vane 52. In one embodiment, the stator 4 comprises a shortened vane 53 for each elongated vane 52. The shortened vanes 53 allow to balance the assembly of the stator 4 while limiting the risk of underloading a stator vane 5 which would be particularly less stressed. This document presents the example of a shortened vane 53 positioned diametrically opposite each elongated vane 52, however it goes without saying that the stator 4 could also comprise one (or more) shortened vane 53 which would not be diametrically opposite with an elongated vane 52. In particular, in the case of a stator 4 comprising an odd number of vanes, no diametrically opposed positioning would be achieved.

Preferably, the interference angular range PA1 has no shortened vane 53, so as to avoid the presence in the interference angular range PAI of a stator vane 5 which would be overloaded by an air flow disturbed by the presence of the aerodynamic obstacle OA. In other words, each stator vane 5 positioned in the interference angular range PAI has a chord at least equal to the chord of a conventional vane 51 and the assembly of the shortened vanes 53 is positioned outside the interference angular range PAI.

Even more preferably, each vane positioned outside the interference angular range PAI has a chord less than or equal to the chord of a conventional vane 51. In other words, the assembly of the stator vanes 5 positioned outside the interference angular range PAI are conventional vanes 51 or shortened vanes 53. In other words, no elongated vane 52 is positioned outside the interference angular range PAI.

In this example, as shown in FIG. 4, the stator 4 comprises, in the angular range diametrically opposite with the interference angular range PAI, three shortened vanes 53, each positioned diametrically opposite one of the three elongated vanes 52.

This document presents the example of a stator 4 comprising three shortened vanes 53, since it comprises three elongated vanes 52. However, it goes without saying that the stator 4 could just as easily comprise a different number of shortened vanes 53, for example a single shortened vane 53, two shortened vanes 53 or a number larger than three shortened vanes 53.

Figure 6:
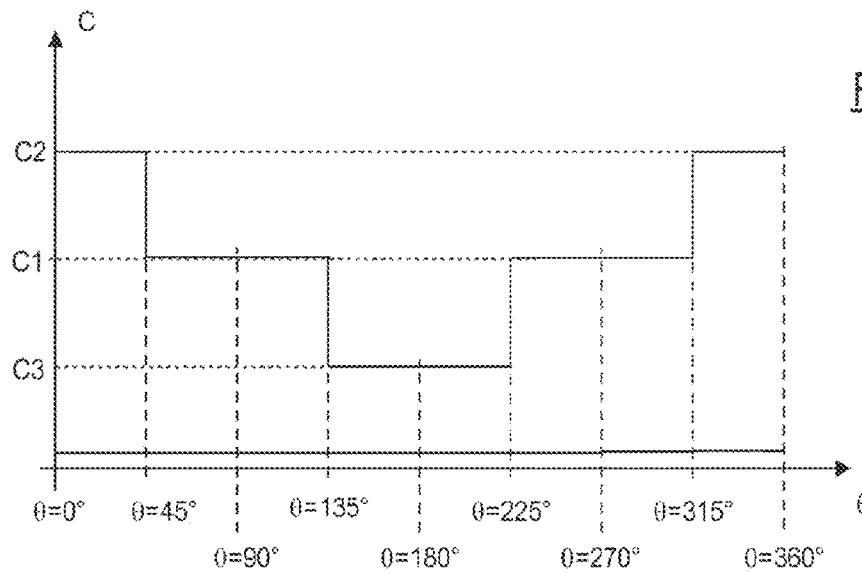
FIG. 6 is a graph showing the evolution of the chord of each vane of the rotor in FIG. 3 as a function of their angular position in the transverse plane.

In one embodiment, the number of elongated vanes 52 represents less than 50% of the total number of stator vanes 5, in the same transverse plane. Preferably, the number of elongated vanes 52 represents less than 40% of the total number of stator vanes 5, in the same transverse plane, preferably less than 30%, even more preferably less than 20% of the total number of stator vanes 5 in the same transverse plane. In this way, only the stator vanes 5 present at least partially in relation with the aerodynamic obstacle OA are elongated vanes 52, which means that the chord of a stator vane 5 is not lengthened unnecessarily, By way of example, as illustrated in FIG. 4, the stator 4 comprises ten stator vanes 5 angularly distributed around the longitudinal axis X, the elongated vanes 52 corresponding to the stator vanes 5 positioned in an angular range between 315° and 45° in the clockwise direction of rotation, the shortened vanes 53 cover an angular range between 135° and 225° in the clockwise direction of rotation. 5 FIG. 6 is a graph showing the change in the chord C1, C2, C3 of each stator vane 5 as a function of its angular position θ, in an example of embodiment. In summary, in this example, over the angular range from 0° to 360°:

each stator vane 5 whose angular position is between 0° and 45° is an elongated vane 52,
each stator vane 5 whose angular position is between 45° and 135° is a conventional vane 51,
each stator vane 5 whose angular position is between 135° and 225° is a shortened vane 53,
each stator vane 5 whose angular position is between 225° and 315° is a conventional vane 51, and
each stator vane 5 whose angular position is between 315° and 360° (i.e.) 0° is an elongated vane 52.

This document presents the example in which each angular range comprises similar conventional vanes 51, elongated vanes 52 or shortened vanes 53, however it goes without saying that each angular range, as defined above, could just as easily comprise a combination of conventional vanes 51 and elongated vanes 52 or a combination of conventional vanes 51 and shortened vanes 53.

Preferably, the chord difference C1, C2, C3 between two adjacent stator vanes 5 is less than 50%, and even more preferably less than 25%. This characteristic means that the performance of the turbine engine 1, and in particular the local performance of the flow in the vicinity of each stator vane 5, is not affected.

This document presents the example of an aerodynamic obstacle OA extending vertically and being attached to an upper portion of the turbine engine 1, i.e. extending around the angular position 0°. However, it goes without saying that the aerodynamic obstacle OA could just as easily extend differently in relation to the turbine engine 1, i.e. extend around an angular position β different from 0°, for example to an angular position of the order of 270° (shown in FIG. 7).

Figure 7:
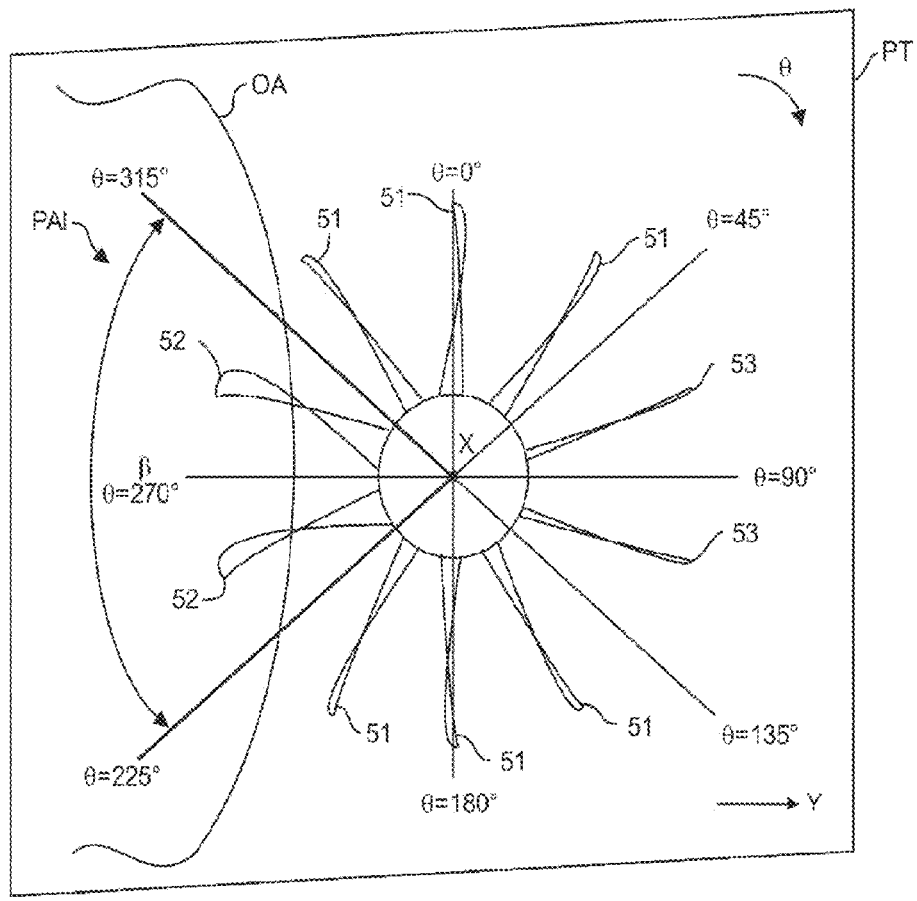
FIG. 7 is a schematic representation of a second example of the distribution of elongated and shortened vanes as a function of their angular position in the case of an aerodynamic obstacle positioned around 270°.

By way of example, as shown in FIG. 7, in the case of a turbine engine 1 installed under a right wing of the aircraft A for example (the term "right" being understood along a transverse axis Y, in a front view upstream of the aircraft A), the aerodynamic obstacle OA may correspond for example to the fuselage of the aircraft, present to the left of the turbine engine 1. In this case, the interference angular range PAI is, for example, between 225° and 315° in the clockwise direction of rotation.

So in this example, over the angular range from 0° to 360°:

each stator vane 5 whose angular position is between 0° and 45° is a conventional vane 51,
each stator vane 5 whose angular position is between 45° and 135° is a shortened vane 53,
each stator vane 5 whose angular position is between 135° and 225° is a conventional vane 51,
each stator vane 5 whose angular position is between 225° and 315° is an elongated vane 52, and
each stator vane 5 whose angular position is between 315° and 360° (i.e.) 0° is a conventional vane 51.

This document presents F example of angular ranges comprising vanes of the same type (conventional 51, elongated 52 or shortened 53), however it goes without saying that the angular range between 45° and 135° could comprise both one or more conventional vanes 51 and one or more shortened vanes 53 and the angular range between 225° and 315° could comprise both one or more conventional vanes 51 and one or more elongated vanes 52.

Similarly, this document presents the example of angular ranges each comprising stator vanes 5 having the same chord C1, C2, C3, although it goes without saying that the stator 4 could just as easily comprise a plurality of stator vanes 5 each having an elongated or shortened chord C of its own. In such a configuration, the stator 4 would comprise as many values of chords C as there are stator vanes 5. Such a stator 4 would offer optimum performance because each stator vane 5 would have a chord C adapted to its own environment.

Preferably, the pitch PAS (shown in FIG. 3) between two stator vanes 5 is independent of the chord C, so if the pitch PAS is the same but the chord C is different between two adjacent stator vanes 5, then the relative pitch (i.e. the ratio of the pitch PAS to the chord C varies with the chord C) is different between two stator vanes 5. Alternatively, the pitch PAS between two stator vanes 5 with different chords C could be different.

Preferably, the maximum thickness Ep (shown in FIG. 3) of the stator vanes 5 is different depending on whether it is a conventional vane 51, an elongated vane 52 or a shortened vane 53 so as to present a constant relative thickness (i.e. a ratio between the maximum thickness Ep and the chord C of the stator vane 5). This characteristic guarantees the mechanical characteristics of each stator vane 5 (flexibility, natural frequency, etc.). Alternatively, the conventional vanes 51, the elongated vanes 52 and the shortened vanes 53 have the same maximum thickness Ep so as to limit the variation in cross-section between two adjacent stator vanes 5, thereby limiting the local flow disturbances.

Optionally, the variation in chord C between two stator vanes 5 can be coupled to a variation in the pitch angle α (shown in FIG. 3) of the stator vanes 5 as described above. Advantageously, such a modification allows to limit the aerodynamic distortion of an airflow applied from downstream to upstream of the turbine engine 1 on the wheel of the stator 4, for example when the aircraft is in flight.

The variable chords on the stator of an unducted turbine engine allow to take advantage of the effects of an aerodynamic obstacle in the vicinity of the turbine engine and its outgoing air flow. Lengthening the chord of the vanes in relation with this aerodynamic obstacle significantly allows to improve the performance of each stator vane, so that the vanes facing the aerodynamic obstacle are more heavily loaded, thereby improving the straightening of the air flow from the rotor and therefore the thrust of the aircraft. A distribution of the conventional vanes, elongated vanes and shortened vanes by angular ranges allows to limit the industrial constraints of stator production and assembly by limiting the number of vanes with different chords, while allowing the loading of each vane to be adapted to its direct environment.

This document describes an aircraft in which a turbine engine comprises stator vanes whose chord is lengthened to adapt the vanes to a larger load due to the presence of an aerodynamic obstacle, but it goes without saying that the chord of the vanes could just as easily be adapted as a function of the load seen by the vanes during the take-off or landing phase or as a function of the load seen by the vanes positioned opposite the rising blades of the rotor during their rotation.

The invention claimed is:

1. An aircraft comprising:
    at least one unducted turbine engine for propulsion of the aircraft, the turbine engine extending along a longitudinal axis and being configured to accelerate an air flow circulating from upstream to downstream, the turbine engine comprising a rotor and a stator mounted downstream of the rotor, the stator comprising a plurality of stator vanes for straightening the air flow coming from the rotor extending radially with respect to the longitudinal axis and distributed angularly about the longitudinal axis, each of the stator vanes comprising a leading edge and a trailing edge defining between them a chord in a plane of revolution defined with respect to the longitudinal axis, each of the stator vanes being defined, in a plane transverse to the longitudinal axis, by an angular position, and
    at least one aerodynamic obstacle, positioned close to the turbine engine, the aerodynamic obstacle causing a change in the circulation of the air flow downstream of the stator vanes,
    wherein the plurality of stator vanes includes conventional vanes each defining a first cord and at least one elongated vane defining a second cord, and wherein the second chord is larger than the first chord, said at least one elongated vane being positioned in an interference angular range defined in relation with the aerodynamic obstacle, so as to increase the straightening of the air flow from the rotor in the interference angular range.

2. The aircraft as claimed in claim 1, further comprising a connecting pylon for connecting the turbine engine to the aircraft, said pylon forming the aerodynamic obstacle.

3. The aircraft according to claim 1, wherein the stator comprises at least two of the elongated vanes positioned within the interference angular range.

4. The aircraft according to claim 1, wherein the angular positions of each the stator vanes are defined in a clockwise direction of rotation over an angular range of 0° to 360°, the angular position 0° being defined as a top position relative to a vertical axis, the aerodynamic obstacle extending substantially around an angular position ($\beta$), the assembly of the stator vanes positioned at the angular position of between −45° and +45° around the angular position ($\beta$) are the elongated vanes.

5. The aircraft according to claim 1, wherein the plurality of stator vanes comprises at least one shortened vane that defines a third chord, the third chord being smaller than the first chord so as to limit a risk of underloading at least one of the stator vanes, said at least one shortened vane is positioned in an angular range diametrically opposed to the interference angular range.

6. The aircraft as claimed in claim 5, wherein the at least one shortened vane is diametrically opposed to the at least one elongated vane.

7. The aircraft according to claim 5, wherein the first chord defines a first length, and the third chord defines a third length, and wherein the third length is equal to 70% to 95% of the first length.

8. The aircraft according to claim 1, wherein the first chord defines a first length and the second chord defines a second length, and wherein the second length is equal to between 105% and 130% of the first length.

9. The aircraft according to claim 1, wherein a chord difference between two stator vanes that are adjacent to one another is less than or equal to 25%.

10. The aircraft according to claim 1, wherein each of the stator vanes defines a maximum thickness in the plane of revolution, a relative thickness of the stator vane corresponding to a ratio of the maximum thickness to the chord, a difference in relative thickness between two of the stator vanes that are adjacent one another having different chords, is less than or equal to 25%.

* * * * *